Figure 4:
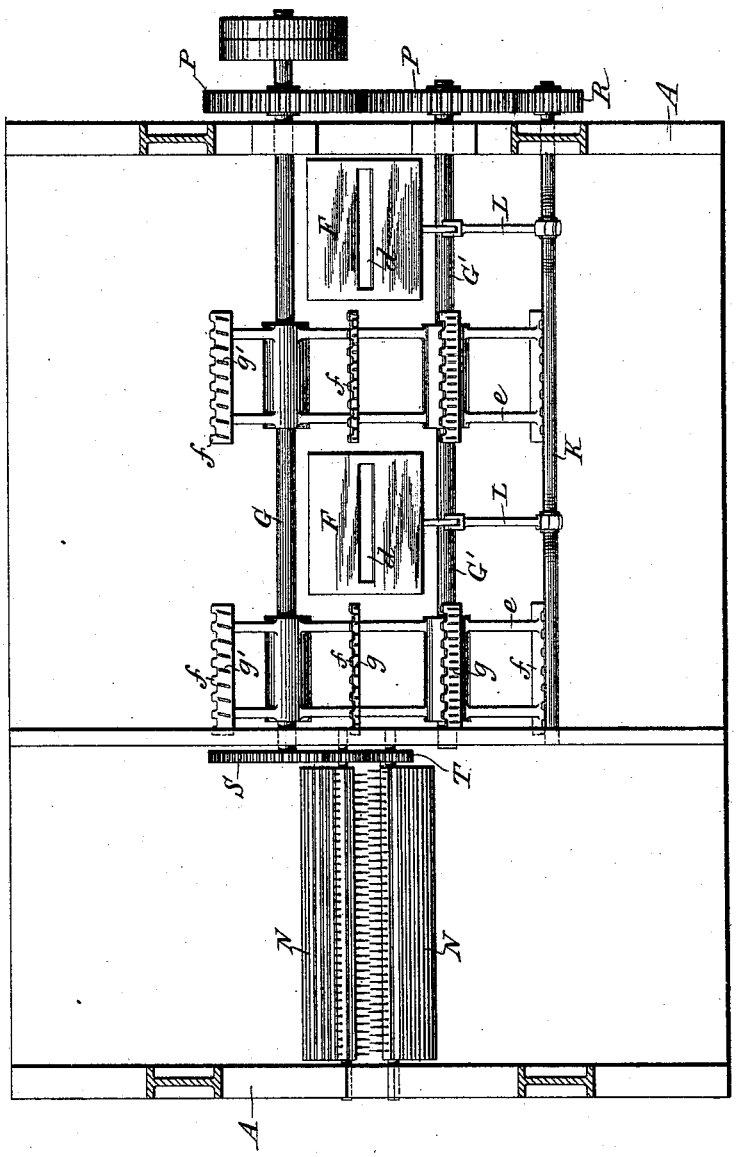

(No Model.) 6 Sheets—Sheet 1.
J. CARDON.
MACHINE FOR BREAKING, SCUTCHING, AND HACKLING FLAX, &c.
No. 469,679. Patented Mar. 1, 1892.
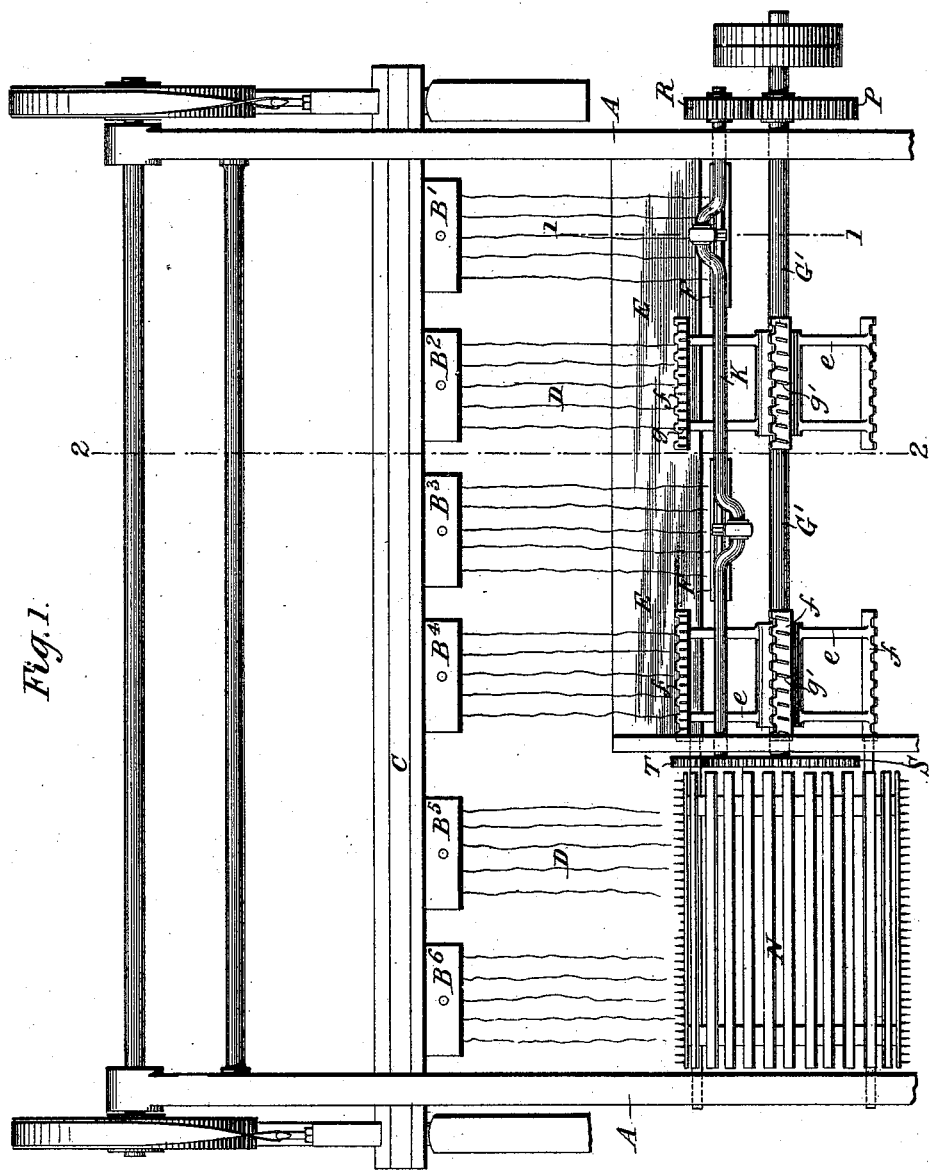
WITNESSES:
Fred White
Q. O. Strang
INVENTOR:
Jules Cardon.
By his Attorneys:
Arthur E. Fraser & Co.

(No Model.) 6 Sheets—Sheet 2.
J. CARDON.
MACHINE FOR BREAKING, SCUTCHING, AND HACKLING FLAX, &c.
No. 469,679. Patented Mar. 1, 1892.
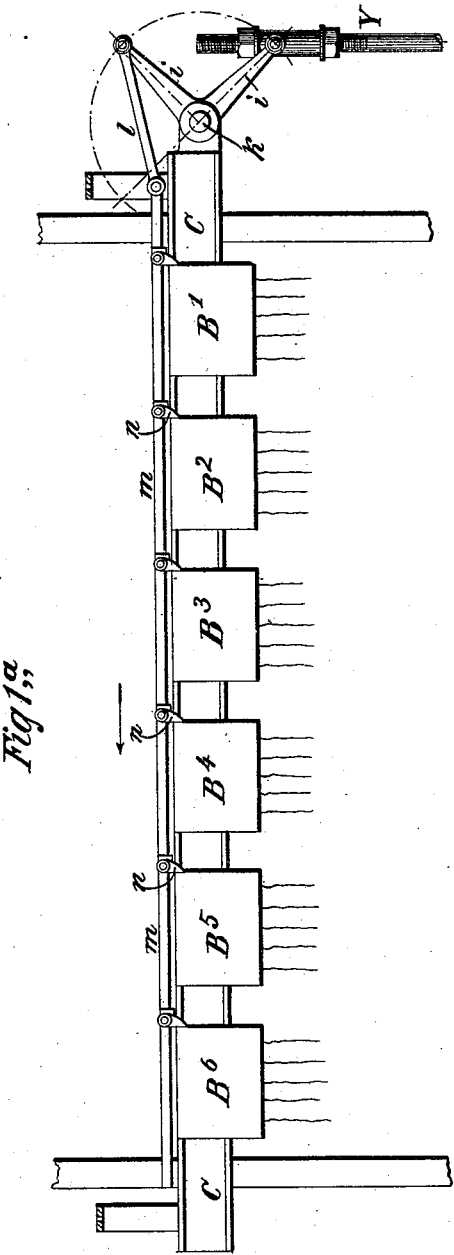
Fig 1.ᵃ
WITNESSES:
John Becker
Fred White
INVENTOR:
Jules Cardon,
By his Attorneys
Arthur C. Fraser & Co.

(No Model.)
6 Sheets—Sheet 3.
J. CARDON.
MACHINE FOR BREAKING, SCUTCHING, AND HACKLING FLAX, &c.
No. 469,679. Patented Mar. 1, 1892.
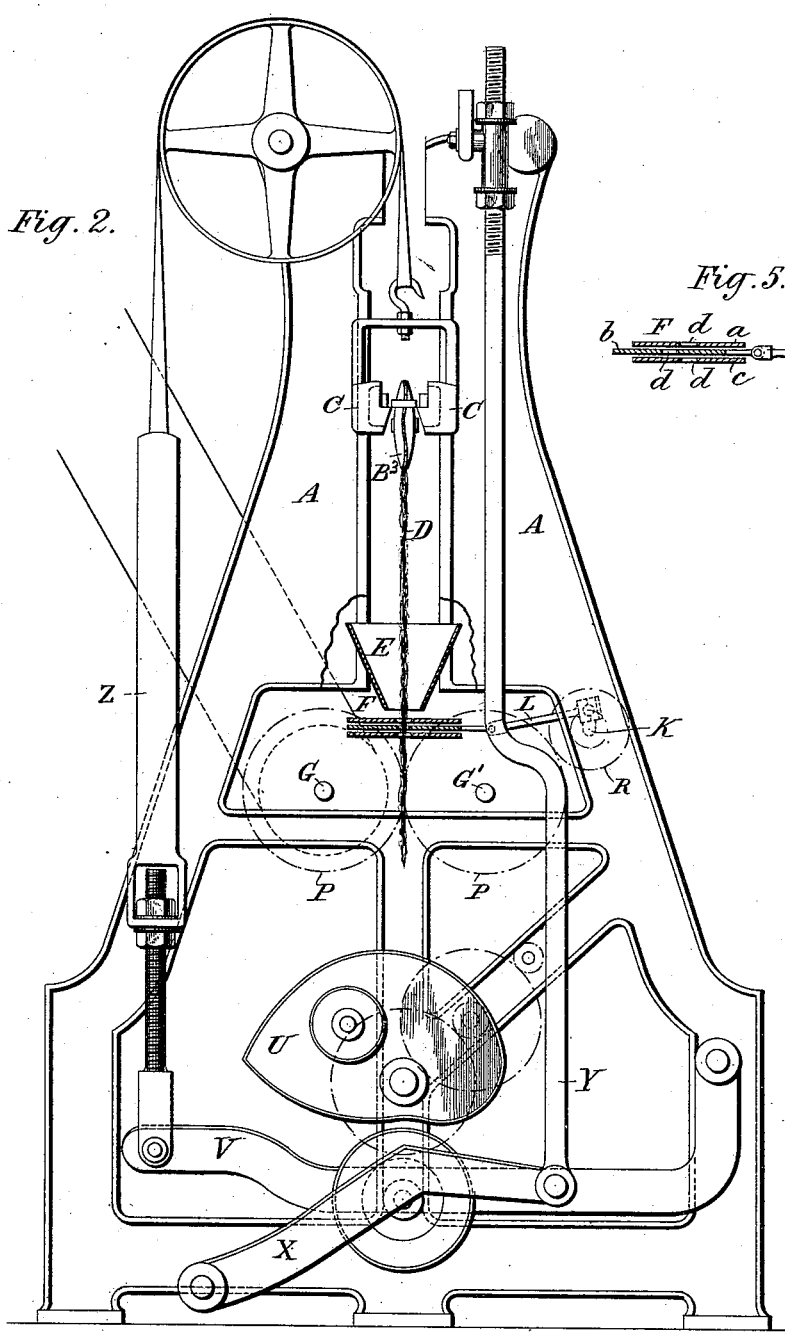
WITNESSES:
Fred White
O. O. Strang
INVENTOR:
Jules Cardon,
By his Attorneys:
Arthur G. Fraser & Co.

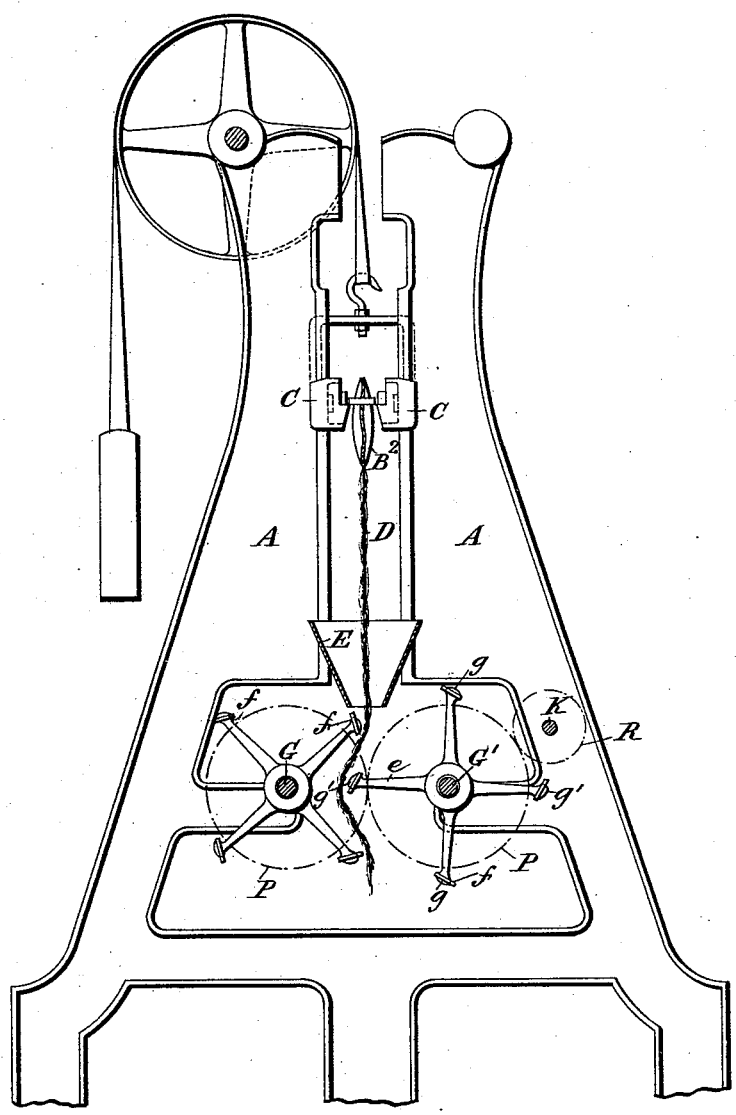

(No Model.) 6 Sheets—Sheet 5.
J. CARDON.
MACHINE FOR BREAKING, SCUTCHING, AND HACKLING FLAX, &c.

No. 469,679. Patented Mar. 1, 1892.

WITNESSES:
Fred White
Q. Q. Strang

INVENTOR:
Jules Cardon,
By his Attorneys:

(No Model.)
6 Sheets—Sheet 6.
J. CARDON.
MACHINE FOR BREAKING, SCUTCHING, AND HACKLING FLAX, &c.
No. 469,679.
Patented Mar. 1, 1892.
Fig. 6.
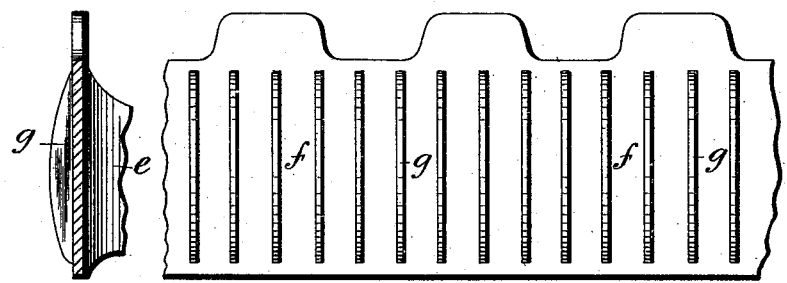
Fig. 7.
Fig. 8.
Fig. 9.
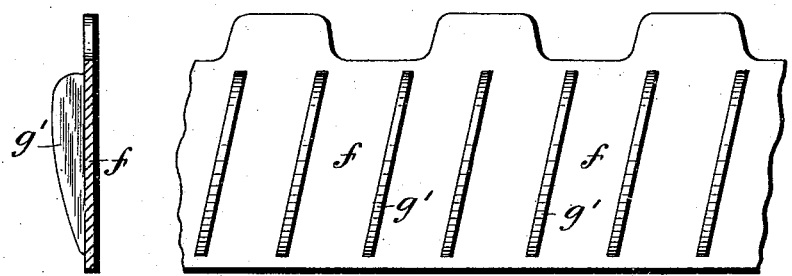
Fig. 10.
Fig. 11.
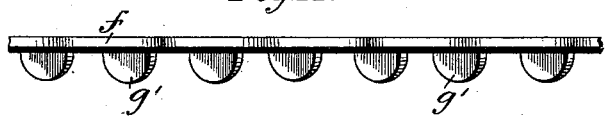
WITNESSES:
Fred White
Q. Q. Strang.
INVENTOR:
Jules Cardon,
By his Attorneys:
Arthur G. Braver &Co.

UNITED STATES PATENT OFFICE.

JULES CARDON, OF LILLE, FRANCE.

MACHINE FOR BREAKING, SCUTCHING, AND HACKLING FLAX, &c.

SPECIFICATION forming part of Letters Patent No. 469,679, dated March 1, 1892.

Application filed November 18, 1890. Serial No. 371,786. (No model.)

*To all whom it may concern:*

Be it known that I, JULES CARDON, of Lille, France, have invented certain new and useful Improvements in Machines for Breaking, Scutching, and Hackling Flax or other Vegetable Fibrous Materials, of which the following is a specification.

This invention has reference to that class of machinery for breaking, scutching, and hackling flax or other vegetable fibrous materials in which stricks or bundles of the fibers to be operated upon are secured in holders or clamps which are mounted on rails and receive a down-and-up movement, so as to properly submit the stricks to the operating devices, and also an intermittent movement endwise of the machine, so as to submit each strick to the various operating devices successively.

The invention consists, first, of a novel construction of scutching devices, and, secondly, of an improved arrangement or combination of devices for breaking, scutching, and hackling the fibers successively in the same machine.

In the accompanying drawings, Figure 1 is a front elevation of the upper part of a machine constructed according to my invention. Fig. 1$^a$ is a fragmentary diagrammatic front view of the upper part of the machine, showing how the intermittent endwise motion is given to the holders or clamps for the fiber. Fig. 2 is a side view of the machine, partly broken away to show a portion in section on line 1 1, Fig. 1, showing the gearing for giving the down-and-up and intermittent endwise movements to the holders or clamps. Fig. 3 is a vertical section on the line 2 2, Fig. 1. Fig. 4 is a plan with the upper part of the machine removed so as to show the various operating devices. Fig. 5 is a vertical section of the breaking device at a time when the intermediate board is not in its central position. Figs. 6, 7, and 8 are detail views on a larger scale, illustrating some of the beater-plates of the scutching devices; and Figs. 9, 10, and 11 are detail views illustrating the other beater-plates of these devices.

In the drawings, A A represent the frame of the machine, B B' B$^2$ B$^3$ B$^4$ B$^5$ B$^6$ the holders or clamps, and C C the rails on which these holders are mounted. The required down- and-up movement is imparted to the holders in the usual way by the cam U, lever V, and counterweighted straps Z Z, which latter are drawn over their pulleys as the lever V is depressed by the cam U and thereby raise the rails C C, attached to the other ends of the straps, (see Fig. 2,) while the intermittent endwise motion is given by means of the lever X, which is depressed by the pulley on cam U and has pivoted to its outer end the rod Y in the manner well known for moving the holders or clamps B' B$^2$ B$^3$ B$^4$ B$^5$ B$^6$ along the rails C. To the upper part of the rod Y is jointed one end of a bell-crank lever $i$, which is pivoted at $k$ and is jointed at its other end to a link $l$, connecting it with one end of a horizontal rod $m$. This rod is free to move endwise and carries a series of pawls or pivoted pushers $n$ $n$. Normally the pushers bear against the ends of the holders B', &c., as seen in Fig. 1$^a$. When the rod Y rises, the bell-crank lever $i$ and link $l$ move the rod $m$ endwise toward the left of the figure, and in this movement the pawls $n$ push the respective holders along the rails C, so that B' moves to B$^2$, B$^2$ to B$^3$, and so on. When the rod Y descends, the rod $m$ is drawn back by the link $l$, the pawls riding over the top of the holders, and then taking up position for their next propelling action on the holders. After every propelling movement of the rod $m$ and pawls $n$ a fresh holder is passed onto the rails C to take the place of B', while the holder B$^6$ at the other end of the rails is removed.

D is the fibrous material locked in the holders.

E is a guide to lead the lower ends of the fibrous material to the breaking and scutching devices.

F is the breaking device. It is composed of several parallel boards or plates having openings or spaces through which the fibrous material passes vertically, and the position of these boards or plates relatively to each other in a horizontal direction is repeatedly changed by a reciprocating movement, so that the fibers are alternately nipped transversely between the edges of the boards or plates and then freed. This repeated action upon the fibers as they gradually pass down the space or opening in or between the boards or plates and again gradually up this space has the effect of breaking the woody part and preparing the fibers for the subsequent operations. Breaking devices of this general character are known; but my device possesses an important novel feature of improvement, in that the boards are placed so close together that normally they practically touch each other, (being only the slightest distance apart,) so that there is not a space between them equal to the thickness of the bundle of fibers, and the outer boards are constructed so thin and flexible that they have enough elasticity to yield slightly as the fibers are nipped between the boards and thereby make room for the stricks or bundles. This important feature is the cause of the great success of my breaking device, since by reason of this the fibers are given sharp bends while in a confined space and under a strong elastic pressure, as distinguished from the long loose bends in free spaces given by such breakers as heretofore made.

In the preferred construction of the breaking device, which is represented in the figures, it is composed of three boards $a\ b\ c$, placed at a slight distance apart. The top and bottom ones $a$ and $c$ are fixed, while the intermediate one $b$ receives a reciprocating movement between them. Each board has a central opening $d$ for the passage of the fibrous material, the openings in the outer boards being beveled and the opening in the intermediate board rectangular. The reciprocating movement of the board $b$ can be imparted in any suitable manner. In the figures it is shown as operated from the rotating shaft G' by means of toothed gearing P R, crank-shaft K, and connecting-rod L. It is obvious that instead of only three boards $a\ b\ c$, as shown, a greater number of boards can be employed, each alternate board receiving a reciprocating movement like the board $b$.

The scutching devices are composed of sets of arms $e\ e$, mounted, respectively, on the rotating shafts G G' and carrying beater or scutcher plates $f\ f$. The arms $e\ e$ are so set relatively to each other that the respective plates $f$ of the one set take between the plates of the other set, as seen in Fig. 3, during the rotation. There are four beater or scutcher plates $f$ in each set—that is to say, on each of the rotating shafts G G'—and these four are alternately of two different forms. One form is seen in Figs. 6, 7, and 8. The plate is undulated, the undulations having rectilinear parts at the outside edge and also at the bottom. On the plates are cast or fixed disks $g$, the form of which is that of an arc. They are in a plane normal to the axis of the beater. The fibers are first struck by the undulating part of the plate and then by the disks, which effect a sort of unraveling of the fibers. Figs. 9, 10, and 11 illustrate the other or alternate beater-plate. These plates are likewise undulated; but they carry disks $g'$, which are oblique and are about twice as far apart as the disks $g$. They are of approximately semi-oval form. These oval oblique disks strike and rub the fibers, thereby removing the broken particles and at the same time straightening the fibers.

N N, Figs. 1 and 4, are hackling devices, which are of a well-known construction, consisting of two endless traveling cloths furnished with hackle-pins. They are driven by toothed gearing S T from the shaft G.

The machine illustrated is shown as arranged for subjecting every strick or bundle of fibrous material to two breaking operations and two scutching operations before the hackling operation—that is to say, the strick is first broken by the breaking device F, (shown under the holder B',) then scutched by the scutching devices, (shown under the holder $B^2$,) then further broken by the breaking device F, (shown under the holder $B^3$,) and then again scutched by the devices shown under the holder $B^4$ before passing onto the hackling devices N, and this is an improved arrangement, which will be found of advantage for the treatment of most fibrous materials.

What I claim, and desire to secure by Letters Patent, is—

1. In a revolving scutching device for flax or other vegetable fibrous materials, the combination, with beater or scutcher plates carried by said device, formed with undulating advancing edges, and having arc-shaped disks arranged close to each other and extending in a plane perpendicular to the axis of the beaters, of other and alternate beater or scutcher plates carried by said device, formed with undulating advancing edges, and having oblique disks extending in a plane inclined to the axis of the beaters and arranged at a greater distance apart than said arc-shaped disks, whereby the fiber receives alternately the action of said closely-arranged perpendicular disks and then of said separated oblique disks, substantially as and for the purpose set forth and shown.

2. In a machine for breaking, scutching, and hackling flax or other vegetable fibrous materials, the combination, with a series of fiber-holders adapted to receive the ordinary down-and-up motion and also the ordinary longitudinal movement endwise of the machine and means for imparting said down-and-up and endwise movements to said holders, of the two breaking devices F F, the one arranged at the front of the machine beneath said holders and adapted to act on the fibers at the beginning of their endwise movement and the other arranged in line with but at a distance from the first, two sets of scutching devices arranged the one between said breaking devices and adapted to act on the fibers next after they pass the first breaking device in their endwise movement and the other arranged after said second breaking device and adapted to act on said fibers next after they pass the latter in their endwise movement, rotating shafts G G', carrying said scutching devices, shaft K, connected to said breaking devices for operating the latter, intermeshing gearing between said shafts for communicating motion from each to the other, and a set of hackling devices arranged next after said second set of scutching devices and adapted to act on said fibers next after they pass said second scutching device in their endwise movement, all combined and arranged substantially as and for the purpose set forth and shown, whereby the fibers in traversing the machine longitudinally thereof are first broken, then scutched, then again broken, then again scutched, and then hackled.

3. In a machine for breaking, scutching, and hackling fibrous material, the combination, with a series of fiber-holders adapted to receive the ordinary down-and-up motion and also the ordinary longitudinal movement endwise of the machine, the track C, carrying said holders, and means for imparting said motions to the latter, of the two breaking devices F F, the two sets of scutching devices having beater-plates $f\ f$ and arranged, respectively, the one between and the other next after said devices F F, shafts G G', carrying said scutching devices, crank-shaft K, connected to and operating said devices F F, gearing P P R on said shafts for driving each from the other, a set of hackling devices N N, arranged next after said second set of scutching devices, and gearing S T T for driving said devices N N, said breaking, scutching, and hackling devices being adapted to act on the fiber successively beneath said track as it traverses the machine, whereby it is alternately broken and scutched and then hackled in its passage longitudinally through the machine, all arranged and constructed substantially as and for the purposes set forth.

In witness whereof I have hereunto signed my name in the presence of two subscribing witnesses.

JULES CARDON.

Witnesses:
 EDMOND SÉE,
 PAUL SÉE.